United States Patent
Heitz et al.

(10) Patent No.: US 6,633,004 B1
(45) Date of Patent: Oct. 14, 2003

(54) SUPPORT INSULATOR

(75) Inventors: Christoph Heitz, Elgg/ZH (CH); Lutz Niemeyer, Birr (CH); Marco Piemontesi, Biasca (CH)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 09/958,547

(22) PCT Filed: Apr. 11, 2000

(86) PCT No.: PCT/CH00/00210
§ 371 (c)(1),
(2), (4) Date: Nov. 30, 2001

(87) PCT Pub. No.: WO00/62309
PCT Pub. Date: Oct. 19, 2000

(30) Foreign Application Priority Data

Apr. 12, 1999 (DE) .......................... 199 16 300
Oct. 18, 1999 (DE) .......................... 199 50 110

(51) Int. Cl.⁷ ............................................. H01B 17/00
(52) U.S. Cl. .............................. 174/137 A; 174/138 G; 174/146
(58) Field of Search .................. 174/137 A, 138 D, 174/138 E, 138 G, 146, 166 S, 179

(56) References Cited

U.S. PATENT DOCUMENTS

| | | | | |
|---|---|---|---|---|
| 4,296,276 A | * | 10/1981 | Ishihara et al. | 174/179 |
| 4,343,966 A | * | 8/1982 | Pargamin | 174/140 S |
| 4,412,012 A | * | 10/1983 | Bouley et al. | 521/54 |
| 4,427,843 A | * | 1/1984 | Ishihara et al. | 174/140 S |
| 4,786,761 A | | 11/1988 | Hama et al. | |
| 4,997,804 A | * | 3/1991 | Pekala | 502/418 |
| 5,389,742 A | * | 2/1995 | Clabburn et al. | 174/209 |
| 5,665,787 A | * | 9/1997 | Nowak et al. | 521/54 |
| 5,759,624 A | * | 6/1998 | Neale et al. | 427/261 |
| 5,902,963 A | * | 5/1999 | Chappaz et al. | 174/167 |

FOREIGN PATENT DOCUMENTS

| | | |
|---|---|---|
| DE | 2021066 | 3/1971 |
| DE | 3140652 A1 | 6/1982 |
| DE | 4007337 C2 | 9/1991 |
| DE | 19604481 A1 | 8/1997 |
| EP | 0281323 A2 | 9/1988 |
| EP | 0588359 A2 | 3/1994 |
| JP | 5-234441 | 9/1993 |
| JP | 07015843 A | 1/1995 |
| JP | 10283861 A | 10/1998 |
| WO | WO98/22958 | 5/1998 |

* cited by examiner

Primary Examiner—Dean A. Reichard
Assistant Examiner—W. David Walkenhorst
(74) Attorney, Agent, or Firm—Burns, Doane, Swecker & Mathis, L.L.P.

(57) ABSTRACT

The electrical insulator has an insulator body 3 which is fitted between an electrical conductor 1 and a grounded holder 2. The surface of the insulator is at least partially formed by a protective body 6. The material of the protective body has a low dielectric constant in comparison to that of the material of the insulator body 3. The protective body 6 prevents an electrically conductive particle 12 from coming to rest directly on the surface of the insulator body 3, in particular in the region of the triple points T, or causing a considerable increase in the field due to immediate proximity to the insulator body 3.

The breakdown voltage of a gas-insulated system which contains such insulators provided with a protective body is increased. Gas-insulated systems can thus be made more compactly and more cheaply, and their life can be extended.

16 Claims, 2 Drawing Sheets

SUPPORT INSULATOR

This application is a National Stage filing under 35 U.S.C. §371 of International Application No. PCT/CH00/00210 having an International Filing Date of Apr. 11, 2000, the entire contents of which are incorporated herein in its entirety.

TECHNICAL FIELD

The invention is based on an electrical insulator for supporting an electrode, which carries high voltage, on a holder as claimed in the precharacterizing clause of patent claim 1.

Such an insulator is used, for example, in medium-voltage and high-voltage technology for supporting a live electrical conductor with respect to grounded parts of a system.

PRIOR ART

An electrical insulator of the type mentioned initially is described, for example in DE 40 07 337 A1. In this insulator, surfaces of an insulated body are coated with an insulating glazing compound with a high dielectric constant for field control.

The surface of the insulating body is a dielectric weak point of the insulator. Electrically conductive particles, such a metal swarf, which enters the encapsulation during installation, or particles detached from the conductor, which can be formed by thermal cycling and the movement resulting from it, have the tendency to adhere to the surface of the insulator body, owing to the high dielectric constant of said insulator body. Such particles lead to a considerably reduced breakdown voltage, since the electric field around the particles is increased by the proximity of the insulator body, resulting in a field peak. A critical zone with regard to flashovers is formed in the region of this field peak.

An electrode for controlling electric fields in a gas-insulated area is described in WO 98/22958. This electrode has an electrically conductive surface and is at least partially coated with a material which has a low dielectric constant. The material contains, for example, a porous foam which, thanks to the enclosed gas, has approximately the same dielectric constant as the surrounding gas, but with a dielectric strength which is greater than that of that gas.

A coating of an insulating supporting element for electrodes, which are directly seated or arranged at a certain distance, for high-voltage switchgear assemblies is known from DE 3140652. This coating is composed of a material having a dielectric constant which is less than that of the material of the supporting element.

BRIEF DESCRIPTION OF THE INVENTION

The invention, as it is specified in patent claim 1, is based on the object of providing an electrical insulator of the type mentioned initially which, despite having a compact construction, is distinguished by high operational reliability when the dielectric load is high.

The surface of the insulator with an insulator body is at least partially formed from a protective body. This has a structure whose mean dielectric constant is less than that of the material of the insulator body. This makes it possible to avoid an excessive field peak in the region of a conductive particle located on the surface of the insulator. In order to achieve a field peak which is as low as possible, the protective body should have a thickness which corresponds to the maximum length of the particles to be considered.

In a first embodiment, the protective body contains a foam. In contrast to the coatings for insulator bodies which are known from the prior art, a gaseous medium surrounding the insulator penetrates into the pores of the foam, thus resulting in the foam having a mean dielectric constant which virtually corresponds to that of the gaseous medium. Syntactic foams are particularly advantageous, since the size of the pores can be controlled well, and this is of major importance for the dielectric strength of the material.

In a further embodiment, the protective body is in the form of a honeycomb, or is formed from a large number of thin walls arranged parallel to the lines of force. The thin walls and the small contact surface areas associated with them advantageously result in small critical zones.

If the insulator is attached to a grounded holder and/or supports an electrical conductor, then it is particularly advantageous to use a flexible or elastic foam. This is guided along the conductor and/or the grounded holder, and thus prevents the ingress of particles into any gap which may be present in the region of the triple point between the insulator body and the holder.

A gas-insulated system having such insulators can be produced more compactly and more cheaply and can be designed for higher voltages while, at the same time, having a longer life expectancy.

BRIEF DESCRIPTION OF THE DRAWINGS

The invention will be explained in more detail in the following text with reference to drawings, in which:

Figure 1:
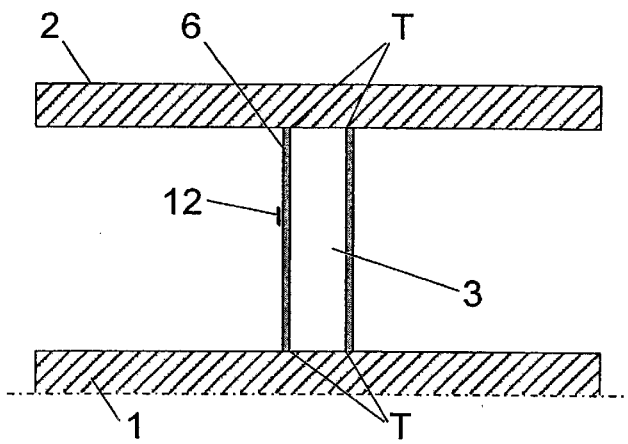
Figure 2:
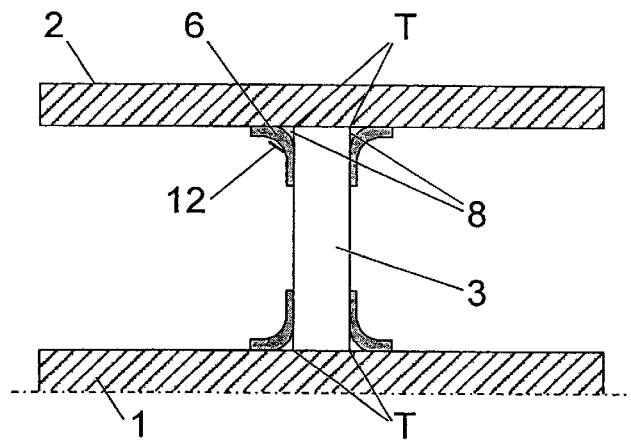
Figure 3:
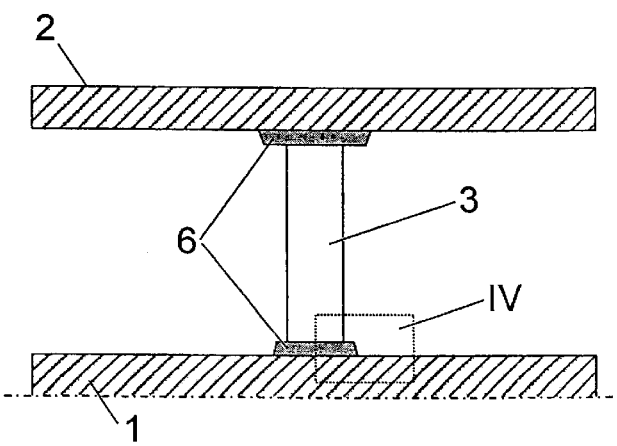
Figure 4:
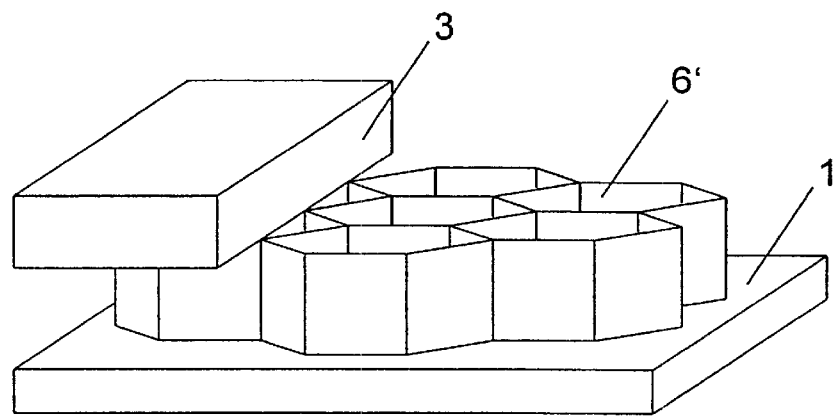
Figure 5:
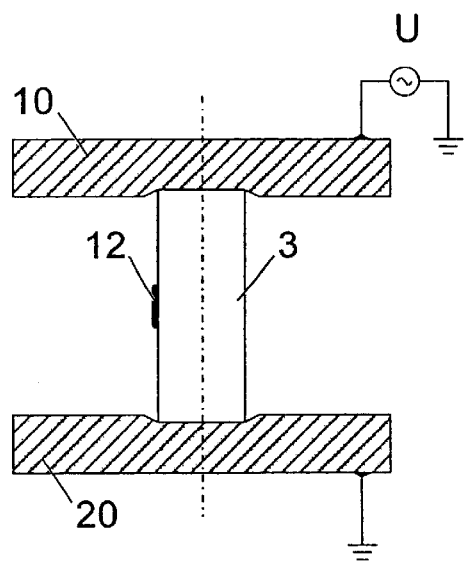
Figure 6:
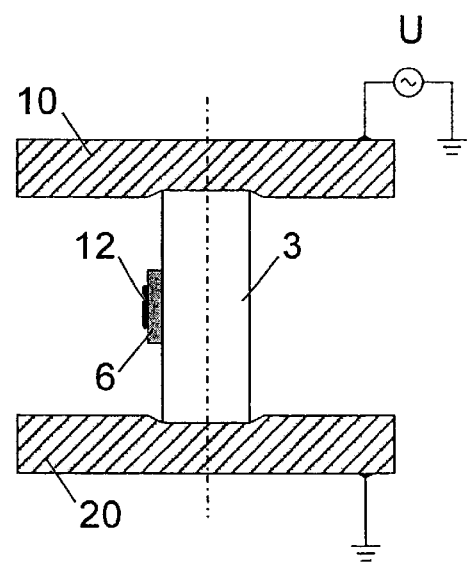

| | |
|---|---|
| FIGS. 1 to 3 | show a view of an axial section through the upper part of an arrangement with three embodiments of the insulator according to the invention, |
| FIG. 4 | shows a view of a part of the arrangement, shown enlarged, from FIG. 3, |
| FIG. 5 | shows a view of an axial section through a test apparatus with an insulator according to the prior art, and |
| FIG. 6 | shows a view of an axial section through a test apparatus with an insulator according to the invention. |

APPROACH TO EMBODIMENTS OF THE INVENTION

Identical reference symbols denote parts having the same effects in all the figures.

FIG. 1 shows an arrangement having an electrical conductor 1, encapsulation 2 which surrounds the conductor, is grounded, is tubular and pressure-resistant, and is formed from an electrically conductive material, and an insulator body 3, which is in the form of a disk and is composed of epoxy materials or other solids with a relatively high dielectric constant (greater than 4.0). The insulator body 3 rests on the encapsulation 2. There is a cavity 7 between the conductor 1 and the encapsulation 2, and this is filled with a gaseous medium, for example $SF_6$, at atmospheric or increased pressure.

A protective body 6, which at least partially forms the surface of the insulator, is fitted on the insulator body 3. This protective body 6 contains a structure having a mean dielectric constant which is less than that of the material of the insulating body 3, preferably in the vicinity of unity. This protective body may, for example, contain a foam with open pores which, thanks to gas being exchanged with the gaseous medium located in the cavity 7, has approximately the same dielectric strength as the medium itself. A foam with closed pores must have an adequate dielectric strength. The foam may also be syntactic, that is to say it may be composed of small hollow spheres which are either sintered to one another or are arranged in a solid matrix. The size of the pores in the syntactic foam may be varied. Small pores allow a high dielectric strength to be achieved. Furthermore, the material may also contain aerogels, in particular composed of silicone, which are distinguished by very low dielectric constants and, thanks to the porous structure, by good dielectric strength.

The object of the protective body 6 is to prevent electrically conductive particles 12 from adhering directly on the insulator body 3, in particular in the region of the triple points T in the region of the junctions between the insulator on the conductor 1 and the encapsulation 1. The area of the insulator body 3 with the relatively high dielectric constant would lead to an increase in the electric fields in the immediate vicinity of the particles 12. Thanks to the protective body 6 with the low dielectric constant, the field peaks in the vicinity of the particles 12 are lower.

The protective body 6 has a thickness of at least 1 mm, which corresponds to the typical maximum length of the particles to be considered.

The protective body 6 may be bonded on the insulator body. This is preferable to manufacturing a two-component insulator body with a comparable dielectric strength. The protective body may be bonded on at points, which is less complex than area bonding.

Furthermore, a thinner cavity may be provided between the insulator body 3 and the protective body 6, provided it is certain that there are no electrically conductive particles in the cavity.

In one preferred embodiment of the insulator according to the invention, as shown in FIG. 2, the protective body 6 covers any gaps 8 which may be present between the insulator body 3 and the encapsulation 2, in the region of the triple points T. The protective body 6 advantageously contains a flexible foam, for this purpose. The protective body 6 is a part of the encapsulation 2, and is drawn along the conductor 1. This makes it possible to prevent electrically conductive particles 12 from entering the gaps 8, where they would adversely affect the dielectric characteristics of the insulator in the region of the triple points T.

In a further embodiment of the insulator according to the invention and as shown in FIG. 3, a protective body 6 is arranged between the insulator body 3 and the encapsulation 2, and/or between the insulator body 3 and the conductor 1. As illustrated in enlarged form in FIG. 4, this protective body may be in the form of a thin-walled, honeycomb layer 6'. Instead of honeycombs, vertical thin walls or supports may also be provided. The important factor is that the thickness of these walls is less than the typical length of the electrically conductive particles, which could lead to a discharge.

The higher breakdown voltage of an electrically conductive particle on a protective body having a low dielectric constant has been verified experimentally. FIG. 5 and FIG. 6 show a test apparatus with two electrodes 10 and 20, one of which is connected to ground, while the test voltage (high voltage) U is applied to the other. A conventional, uncoated epoxy post 3 is fitted between the electrodes 10 and 20, and is intended to simulate an insulator body. For a first test (FIG. 5), a 4 mm-long, electrically conductive particle 12 is bonded in the center of the post 3. For a second test (FIG. 6), a protective body 6 in the form of a 6 mm-thick layer, with a 4 mm-long particle 12 on it, is fixed in the center of the post 3. The test apparatus is surrounded by insulating gas ($SF_6$) at increased pressure (5 bar).

The second test, with the layer on the support, resulted in the breakdown voltage being increased by around 75% in comparison to the first test without any coating. The protective body on the insulator body thus allows the hazard presented by electrically conductive particles to be reduced considerably.

In addition to being used in gas-insulated systems, such insulators can also be used in other encapsulated systems, in particular those with non-conductive encapsulation, or in non-encapsulated systems, in particular outdoor systems.

| LIST OF DESIGNATIONS | |
|---|---|
| 1 | Electrode, electrical conductor |
| 2 | Holder, encapsulation |
| 3 | Insulator |
| 6, 6' | Protective body |
| 7 | Gas area |
| 8 | Gap |
| 10, 20 | Electrodes |
| 12 | Electrically conductive particle |
| T | Triple point |
| U | Voltage source |

What is claimed is:

1. An electrical insulator for supporting an electrode, which carries high voltage, on a holder having
    an insulator body and
    at least one protective body which at least partially forms the surface of the insulator,
    wherein
        the protective body contains a porous structure which has a mean dielectric constant which is less than that of the material of the insulator body in order to avoid an excessive field peak in the region of an electrically conductive particle located on the surface of the insulator, and
    the protective body has a thickness corresponding to the maximum length of the particles to be considered.
2. The insulator as claimed in claim 1, wherein
the material of the protective body has a dielectric constant which is less than 2.5.
3. The insulator as claimed in claim 1, wherein
the protective body has a thickness of at least 1 mm.
4. The insulator as claimed in claim 1, wherein
the protective body is flexible.
5. The insulator as claimed in claim 1, wherein
the protective body contains a porous foam.
6. The insulator as claimed in claim 5, wherein
the foam is a syntactic foam.
7. The insulator as claimed in claim 1, wherein
the protective body contains an aerogel.
8. The insulator as claimed in claim 1, wherein
the protective body has many thin walls, whose thickness is in each case less than a typical length of the electrically conductive particles.
9. The insulator as claimed in claim 8, wherein
the protective body is in the form of a honeycomb.
10. The insulator as claimed in claim 1, wherein
the protective body is bonded to the insulator.

11. The insulator as claimed in claim 1, wherein the protective body is at least one of:
   arranged in a region in which the insulator is adjacent to the holder and arranged in a region in which the insulator is adjacent to the electrode.

12. The insulator as claimed in claim 1, wherein the protective body is at least one of:
   at least partially arranged between the insulator body and the holder, and
   at least partially arranged between the insulator body and the electrode.

13. The insulator as claimed in claim 1, wherein the protective body extends along at least one of:
   a part of the electrode and
   a part of the holder.

14. The insulator as claimed in claim 1, wherein the holder is electrically conductive.

15. The insulator as claimed in claim 1, wherein the material of the protective body has a dielectric constant which is less than 1.5.

16. The insulator as claimed in claim 1, wherein the walls have a thickness of less than 1.5 mm.

* * * * *